US012200534B2

United States Patent
Nair et al.

(10) Patent No.: US 12,200,534 B2
(45) Date of Patent: Jan. 14, 2025

(54) EQUAL COST MULTIPATH AND APPLICATION QUALITY OF EXPERIENCE BASED ON VARIABLE LOSS, LATENCY, AND BANDWIDTH

(71) Applicant: CradlePoint, Inc., Boise, ID (US)

(72) Inventors: Deepak Nair, San Jose, CA (US); Prashant Pai, Los Gatos, CA (US)

(73) Assignee: CRADLEPOINT, INC., Boise, ID (US)

(*) Notice: Subject to any disclaimer, the term of this patent is extended or adjusted under 35 U.S.C. 154(b) by 223 days.

(21) Appl. No.: 17/544,704

(22) Filed: Dec. 7, 2021

(65) Prior Publication Data
US 2023/0180051 A1 Jun. 8, 2023

(51) Int. Cl.
*H04W 28/02* (2009.01)
*H04W 24/08* (2009.01)

(52) U.S. Cl.
CPC ....... *H04W 28/0268* (2013.01); *H04W 24/08* (2013.01)

(58) Field of Classification Search
CPC ............ H04W 28/0268; H04W 24/08; H04W 28/00–0205
See application file for complete search history.

(56) References Cited

U.S. PATENT DOCUMENTS

| | | | |
|---|---|---|---|
| 2009/0310509 A1* | 12/2009 | Kumai | H04W 48/18 370/254 |
| 2016/0080251 A1* | 3/2016 | Ramachandran | H04L 43/0817 370/389 |
| 2019/0288950 A1* | 9/2019 | Dhanabalan | H04L 43/0852 |
| 2019/0320479 A1* | 10/2019 | Choudhary | H04L 45/24 |
| 2020/0366747 A1* | 11/2020 | Bordia | H04L 65/762 |
| 2021/0029019 A1* | 1/2021 | Kottapalli | H04L 41/5025 |
| 2023/0059940 A1* | 2/2023 | Shankar | H04L 67/1036 |
| 2023/0080537 A1* | 3/2023 | Ramanathan | H04L 45/308 709/238 |
| 2023/0118718 A1* | 4/2023 | Solanki | H04L 12/4633 726/12 |

* cited by examiner

*Primary Examiner* — Kibrom T Hailu
*Assistant Examiner* — Najeeb Ansari
(74) *Attorney, Agent, or Firm* — Parsons Behle & Latimer

(57) ABSTRACT

A method and a system for steering traffic in a wireless network. The method and system include an ingress point and an egress point of the wireless network with a plurality of paths between the two points. A plurality of hops are located along the plurality of paths. The plurality of paths may be bound as a single pipe at a logical level. The system may determine a quality of experience (QOE) score. Automated steering policies may be based on the QOE score. Traffic may be steered at each hop based on the automated steering policies. The QOE score may be determined by measuring bandwidth, loss, latency, and jitter at each hop. A customer may provide prioritization at an application level and the automated steering policies may also be based on the customer prioritization.

20 Claims, 8 Drawing Sheets

EQUAL COST MULTIPATH AND APPLICATION QUALITY OF EXPERIENCE BASED ON VARIABLE LOSS, LATENCY, AND BANDWIDTH

FIELD OF THE DISCLOSURE

The examples described herein relate generally to systems and methods for steering traffic in a network. In particular, the examples described herein relate to dynamically steering traffic based at least in part upon automated steering policies that are based at least in part on a Quality of Experience (QOE) score.

BACKGROUND

Description of the Related Art

Wireless networks such as clouds are used in many applications to transmit data and applications between sites. A gateway may be used to connect a network device, such as a router, to the cloud. The gateway typically includes policies that determine how to steer traffic through the cloud. The policies are not dynamic and, thus, do not change based on the changing conditions of the network. For example, the policies utilized by the gateway typically do not take into the variable bandwidth of the network. The transfer of packets of data across the network is not optimized because of the variable bandwidth of the network. In other words, the traffic steering policies of the gateway are not dynamic and, thus, steer traffic based on the network conditions.

As another example, the policies utilized by the gateway typically do not take into account prioritization of applications set by a user. A user may be utilizing multiple applications but may place a higher priority on one or more of the applications. The gateway merely applies its static policies in steering the data packets of the multiple applications, which may not optimize the transfer of packets of the highest priority application. Other disadvantages also exist.

SUMMARY

The present disclosure is directed to systems and methods for steering traffic in a wireless network, such as a cloud network. One embodiment of the present disclosure is a tunnel-less architecture that enables communication over multiple clouds, multiple cellular providers, and/or multiple telephone company networks.

One embodiment of the disclosure is a method for steering traffic in a wireless network. The method includes providing an ingress point of the wireless network and an egress point of the wireless network, with a plurality of paths between the ingress point and the egress point, wherein a plurality of hops are located along the plurality of paths between the ingress point and the egress point. The method includes binding the plurality of paths as a single pipe at a logical level and determining a quality of experience (QOE) score. The method includes providing automated steering policies, wherein the automated steering policies are based on the determined QOE score. The method includes steering traffic at each hop based on the automated steering policies.

Determining the QOE score of the method may include measuring bandwidth, loss, latency, and jitter at each hop of the plurality of hops. The method may include receiving customer prioritization at an application level. The automated steering policies may also be based on the customer prioritization at the application level. Measuring bandwidth, loss, latency, and jitter at each hop to determine the QOE score may include measuring at a per packet level or measuring at a per segment level. The method may include determining a current QOE score at each hop. The method may include comparing the current QOE score at each hop to a historical QOE score per path. Providing automated steering policies may include embedding a control packet at each hop. Steering traffic at each hop may be based on a historic average bandwidth QOE score based on a bandwidth QOE score of each path.

Providing automated steering policies may be based on a seven-day aggregate value of bandwidth at the hop and a seven-day aggregate value of bandwidth variance at the hop. Providing automated steering policies may be based on an average number of concurrent flows and a variance in the average number of concurrent flows at a specified time. Providing automated steering policies may be based on an average aggregate packet size and a variance in the average aggregate packet size at the specified time. Providing automated steering policies may be based on an average bandwidth at the specified time and a total number of samples of bandwidth. Providing automated steering policies may be based on concurrent flows measured at the specified time and a total number of samples for concurrent flows. Providing automated steering policies may be based on a concurrent packet size at the specified time and a total number of samples of concurrent packet size. Providing automated steering policies may be based on a seven-day aggregate value of average package loss at a hop and a twenty-four-hour aggregate value of average packet loss at the hop.

One embodiment of the present disclosure is a system comprising a cloud network and a controller net cloud services gateway (C-NCSG). The system includes an ingress net cloud services gateway (I-NCSG) and an egress net cloud services gateway (E-NCSG). The system includes a plurality of paths between the I-NCSG and the E-NCSG and a plurality of hops along the plurality of paths. The C-NCSG generates automated steering policies and each hop steers traffic along the plurality of paths between the I-NCSG and the E-NCSG based on the automated steering policies.

The C-NCSG may generate the automated steering policies based on a customer prioritization at an application level. The C-NCSG may generate the automated steering policies based on a quality of experience (QOE) score. The QOE score may be determined by a measurement of bandwidth, loss, latency, and jitter at each hop. The measurement of bandwidth, loss, latency, and jitter may be measured at a per packet level or at a per segment level.

Figure 1:
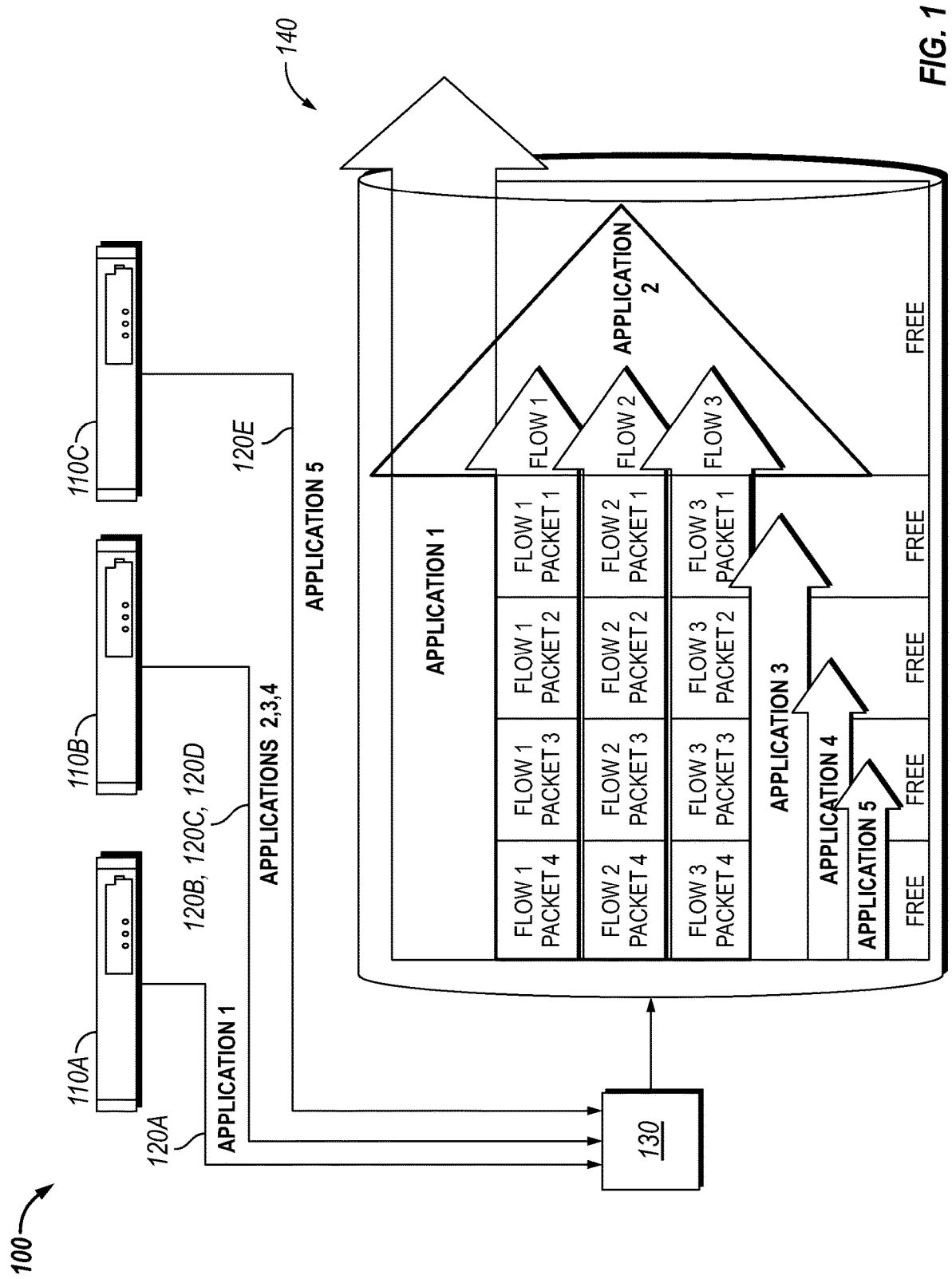
FIG. 1 is a schematic that shows a plurality of microflows aggregated from multiple sites.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 is a schematic 100 that shows a plurality of microflows 140 aggregated from multiple sites 110A, 110B, 110C. Each site 110A, 110B, 110C is capable of transmitting and receiving data via a network device, or devices, such as, but not limited to, a router or the like. Each site may be transmitting and/or receiving an application to and/or from a destination site. For example, the first site 110A may be utilizing a first application 120A. The second site 110B may be utilizing a second application 120B, a third application 120C, and a fourth application 120D. The third site 110C may be utilizing a fifth application 120E. The number of sites and applications are shown for illustrative purposes and may be varied as would be appreciated by one of ordinary skill in the art having the benefit of this disclosure.

Each site 110A, 110B, 110C communicates with a net cloud services gateway (NCSG) 130 that aggregates the connections with each site 110A, 110B, 110C and converts each connection into microflows 140 as shown in FIG. 1. The NCSG 130 does link aggregation with the multiple sites 110A, 110B, 110C. Each application 120A-120E may be split across multiple microflows 140 by the NCSG 130 based on both a Quality of Experience (QOE) score as well as priority of the application 120A-120E as discussed herein. The QOE score may be determined based on measurements of the network as discussed herein. Each application 120A-120E may also be able to flow through multiple paths along a network as shown in FIG. 2.

Figure 2:
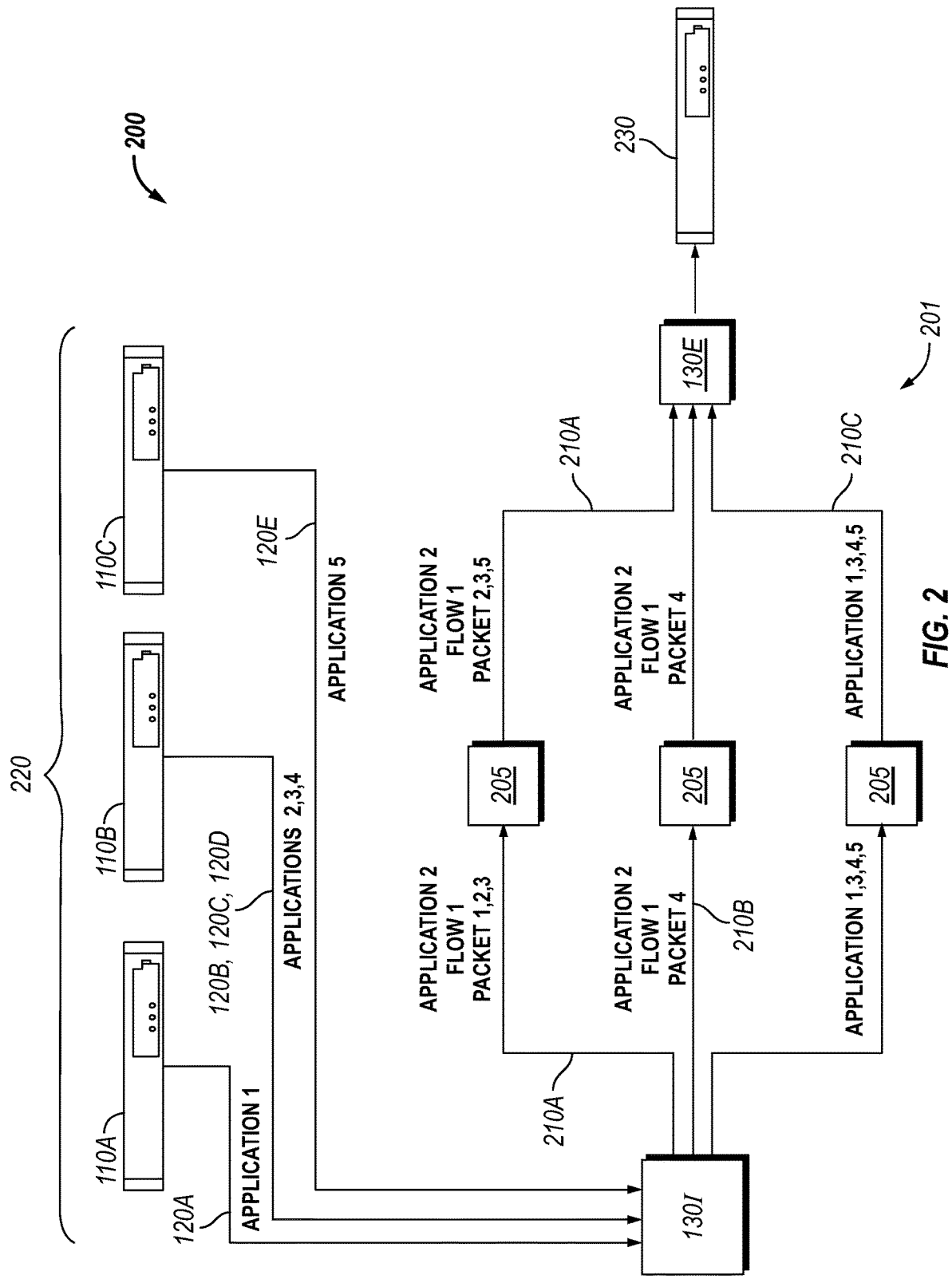
FIG. 2 is a schematic that shows a plurality of paths between an ingress point and an egress point of a network, such as a cloud.

FIG. 2 is a schematic 200 that shows a plurality of paths 205 between an ingress NCSG (I-NCSG) 130I and an egress NCSG (E-NCSG) 130E of a network 201, which may be, but is not limited to a cloud. A plurality of paths 205 may be bound together as a single pipe at the logical level. The I-NCSG 130I and the E-NCSG 130E enable optimal communication between multiple sites 110A, 110B, 11C, which may be are collectively referred to as a source location 220, and a destination 230, which also could be multiple sites as would be appreciated by one of ordinary skill in the art having the benefit of this disclosure. As discussed above, each site 110A, 110B, 110C may utilize one or more applications 120A-120E. The I-NCSG 130I determines the paths 205 to utilize for each application 120A-120E due to policies determined by QOE scores and/or application priority as discussed herein. The E-NCSG 130E will reconstruct the packets to deliver the application to the destination 230 as the flows reach the E-NCSG 130E. One benefit is the I-NCSG 130I provides multiple paths because it can utilize multiple clouds, such as but not limited to Amazon Web Services, Google Cloud, Microsoft Azure, Megaport, and Equinix, it can utilize multiple cellular providers, such as but not limited to AT&T and Verizon, and it can utilize multiple telephone company providers.

Figure 3:
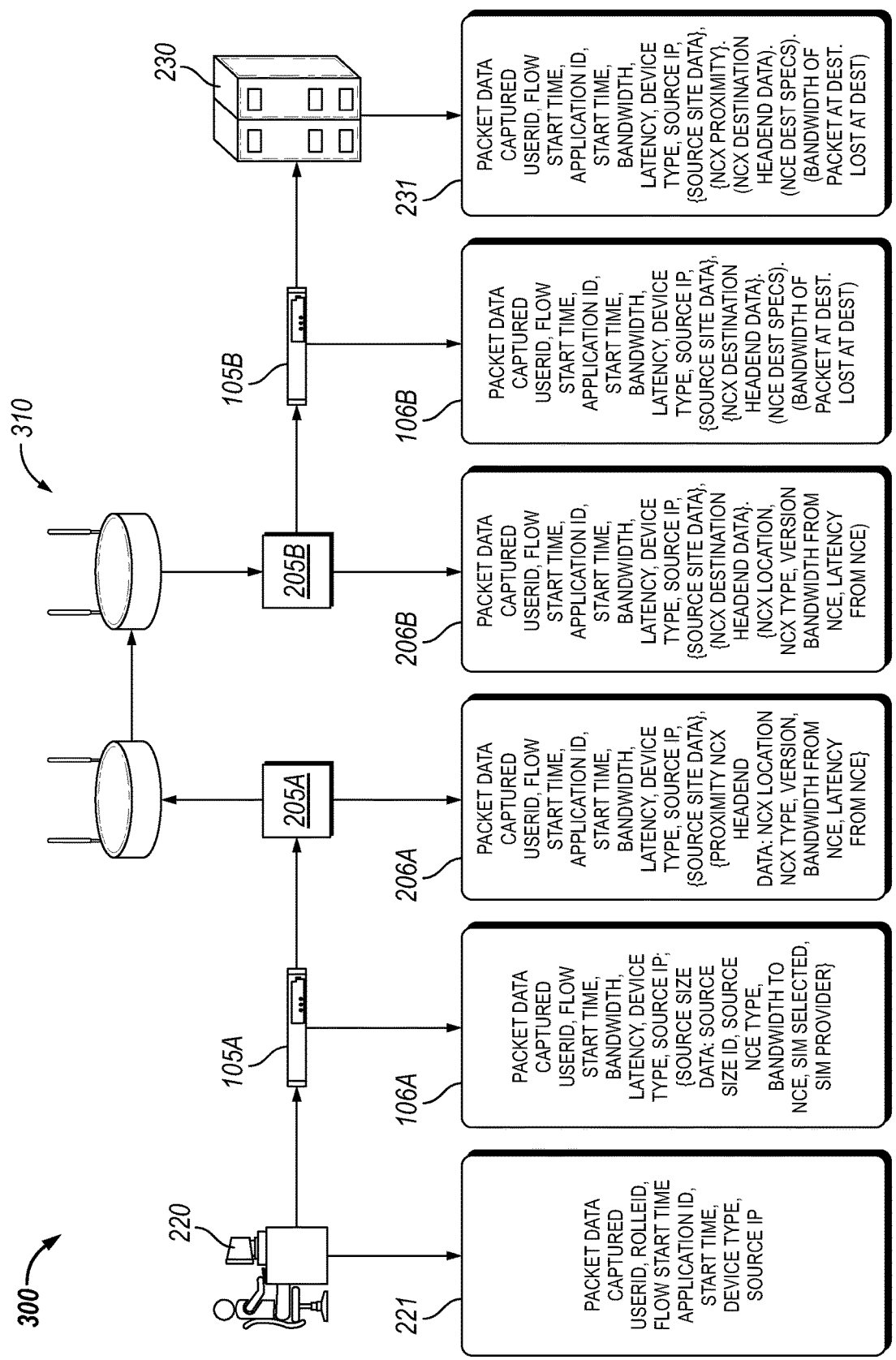
FIG. 3 is a schematic that shows an embodiment of a plan for capturing data at each hop between a starting location and destination location.

FIG. 3 is a schematic that shows an embodiment of a plan 300 for capturing data at each hop along the paths between a starting location 220 and destination location 230 on a cloud and/or wireless network. The hops may include various numbers and configurations of network communication elements (NCEs) 105, 205 and NCXs 205A, 205B along the paths. The NCE may be a router, mobile device, or the like. The NCX may be a server, net cloud services gateway, or the like. A path between the starting location 220 and destination location 230 may include an unknown carrier network 310. Data may be collected from a NCX 205A prior to entrance of the unknown carrier network 310 and from a NCX 205B upon exiting the unknown carrier network 310.

Various data 221 is collected by the system at the starting location 220. The data 221 may be, but is not limited to, packet data, capture user ID, role ID, flow start time, application ID, start time, device type, source IP, and the like. Various data 106A is collected by the system at a first NCE 105A. The data 106A from the first NCE 105A may be packet data, capture user ID, flow start time, application ID, start time, bandwidth, latency, device type, and source IP. Various data 206A is collected by the system at a first NCX 205A. The data 206A from the first NCX 205A may be packet data, capture user ID, flow start time, application ID, start time, bandwidth, latency, device type, source IP, and the like. Additionally, the data 206A from the first NCX 205A may include proximity headend NCX data, location, NCX type, version, bandwidth from NCE, and latency from NCE.

Various data 206B is collected by the system at a second NCX 205B. The data 206B from the second NCX 205B may be packet data, capture user ID, flow start time, application ID, start time, bandwidth, latency, device type, and source IP. Additionally, the data 206B from the second NCX 205B may include proximity NCX headend data, NCX location, NCX type, version, bandwidth from NCE, and latency form NCE. Various data 106B is collected by the system at a second NCE 105B. The data 106B from the second NCE 105B may be packet data, capture user ID, flow start time, application ID, start time, bandwidth, latency, device type, and source IP. Various data 231 is collected by the system at the destination location 230. The data 231 may be packet data, capture user ID, flow start time, application ID, start time, bandwidth, latency, device type, and source IP.

The configuration shown in FIG. 3 may be varied as would be appreciated by one of ordinary skill in the art having the benefit of this disclosure. For example, the number and location of each NCSG and network device may be varied. The data collected at each hop is used to determine a QOE score. The system uses the QOE score to implement the traffic steering policies over the cloud or wireless network. A controller NCSG automatically generates traffic steering polices based on the QOE score and/or application priority as discussed herein. These traffic steering policies are dynamically generated due to the collection of data from each hop along the wireless network and used to determine how to optimally steer traffic through the wireless network.

A QOE score may be determine using one or more of the following formulas:

QOE Score at Source=0

QOE Score at a NCE directly connected to the source ($SQ_{OE}$)=available bandwidth/time take to transmit (in seconds)

QOE Score at the NCX connected to the source site NCE ($SN_{CX}Q_{OE}$)=($SQ_{OE}$+(available bandwidth from NCE to NCE/Time taken to transmit from NCE to NCX))/2

QOE Score at destination NCX ($DN_{CE}Q_{OE}$)= ($DN_{CX}Q_{OE}$+(available bandwidth from Carrier Network (Middle Mile) to NCX/Time taken from source NCX to destination NCX))/2

QOE Score at the destination NCE $(DN_{CX}Q_{OE})$= $(DN_{CX}Q_{OE}$+(available bandwidth from Destination NCX to Destination NCE/Time taken from destination NCX to destination NCE))/2

The QOE score at the destination NCE may be used for validation to a service level agreement (SLA) from end to end and may be reported to a customer as an SLA violation. The QOE score and the destination NCE may be used to determine end to end SLA creep as the packet moves through the network. The bandwidth QOE score may be measured at a per carrier network level and may be compared to the bandwidth SLA provided by the carrier to identify potential SLA violations between each hop. A historic average bandwidth QOE score may be used to select path of traffic movement based on the bandwidth QOE score for each path. An application SLA for bandwidth may be set by the customer at the network level by setting the priority of an application at the network level, which may be converted to the Application QOE score at a per site level.

The customer may also designate a cost threshold that is not to be exceeded, which may be used to determine the QOE score. For example, a customer may want to limit and/or prevent traffic on a particular cellular, or other wireless network, to ensure that the cost of the transmission does not exceed a threshold amount or level. The QOE score may take into account the customer's cost limit and steer traffic based on automated polices generated due to the QOE score. In other words, the customer may designate to sacrifice potential optimization due to a larger desire to limit the costs of the communication over the wireless network.

Traffic steering policies may be implemented at individual NCEs and/or NCSGs. A potential QOE score at a hop may be use a historic QOE score of the site-to-site path taken and variance from that QOE score. In this instance, 7-day aggregate QOE scores will handle (i.e., minimize) network variations due to unknown dedicated internet access (DIA) traffic. The traffic steering policies may take into account anomalies due to seasonal changes (e.g., holidays) or other changes or events. The traffic steering policies may set a tolerable variance that is within +/−3 limits. One or more of the following may be used to determine a historic QOE score at a hop.

Average Time of Day Bandwidth at Hop—Last 7 Days (ATB7)
Average Time of Day Bandwidth Variance at Hop—Last 7 Days (AVTB7)
Average Number of Concurrent Flows at Time—Time of Day (ANCT)
Variance in Concurrent Flows—Time of Day (ANCVT)
Average Aggregated Packet Size—Time of Day (AAPST)
Variance in Packet Size—Time of Day (AVPST)
Bandwidth Measured—Time of Day (BTD)
Total Number of Samples—Bandwidth (TNSB)
Concurrent Flows Measured—Time of Day (CFTD)
Total Number of Samples for Concurrent Flow (TNSCF)
Concurrent Packet Size—Time of Day (CPSTD)
Total Number of Samples for Concurrent Packet (TNSCP)
Average Packet Loss at Hop—Time of Day—Last 7 days—computed for the next potential Hop (APLT)
Average Packet Loss at Hop—Last 24 Hours—computed for the next potential hop (APLD)
AVTB7=SUM (BTD−ATB7)/(TNSB−1)
ANCVT=SUM (CFTD−ANCT)/(TNSCF−1)
AVPST=SUM (SUM (CPSTD)−AAPST)/(TNSCP−1)

One or more of the following may be used to set a +/−3 variance limit measure to measure value at a hop.
If (current Bandwidth−ATB7) is between −3*AVTB7 and 3*AVTB7 then 1 else 0 end AS BQOe
If (Current Flows−ANCT) is between −3*ANCVT and 3*ANCVT then 1 else 0 end AS FQOe
If (Current Concurrent Packet Size−AAPST) is between −3*AVPST and 3*AVPST then 1 else 0 end AS PQOe One or more of the following may be used to consider current available bandwidth and size of the current concurrent packet in the forwarding paths.
Packet Proportionate bandwidth (PPB)=(Packet Size*ATB7)/AAPST
If (Packet Size>50% ATB7) Then 0 else 1 end AS PBQOE
If (Packet Size/Current concurrent packet size)>0.5 then 0 else 1 end AS PCQOe As discussed herein, the system may include customer prioritization and SLA at an application level with 1 being the highest priority and 3 being the lowest priority. Application priority may be set at high (1), medium (2), or low (3) priority. The following may be used to apply the application priority to application packets.
Application Packet Priority (APPR)=(BQOe+FQOe+PQOe+PBEOE+PCQOe)*ASLA If loss is increasing at the site where the next hop is identifying chance of pack loss, the following may be used add the loss condition.
If APLD>APLT Then APLD/(Total Packet Loss at all potential Hops) END AS APLOSS As discussed herein, the system provides a dynamic traffic steering policy to each hop along paths between the source and destination. A rule for choosing the next hop may be a function of APPR and APLOSS. Ideally, APPR should be reverse of APLOSS. APPR may be measured per physical link. Packets may be ranked by their APP score per physical link. Packets with the lowest APP score should be sent through a link or tunnel having the highest bandwidth. In this way, the traffic steering may be optimized through a wireless network such as a cloud. The measurements discussed herein may be made at each hop at a per packet level. The measurements discussed herein may be made at each hop at a per segment level.

Figure 4:
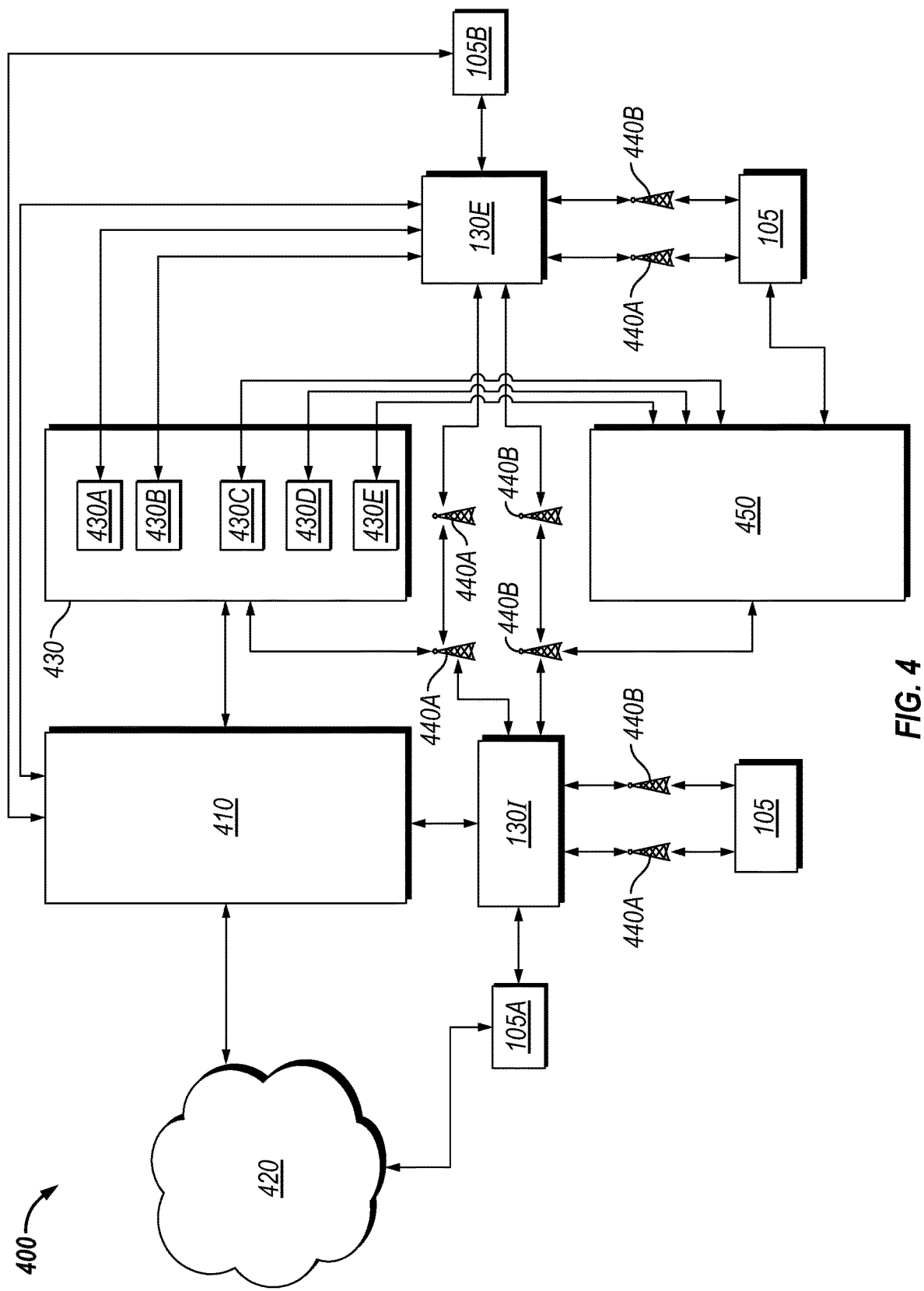
FIG. 4 is a schematic of an embodiment of a system for steering traffic.

FIG. 4 is a schematic of an embodiment of a system 400 for steering traffic. The system 400 includes a source NCE 105A that is communicating with a destination NCE 105B over a wireless network. The source NCE 105A may connect to the system 400 via an I-NCSG 130I and the destination NCE 105B may connect to the system 400 via a E-NCSG 130E. The I-NCSG 130I may be located in a first data center of a customer. The E-NCSG 130E may be located in a second data center of a customer. The customer may include NCEs 105 connected to the system 400 in satellite data centers. The NCEs 105 in the satellite data centers may be connected to the system 400 by various links. For example, the NCEs 105 may be connected via cellular networks 440A, 440B.

The system includes a controller NCSG (C-NCSG) 410 that may be wirelessly connected to the system 400. For example, the C-NCSG 410 may be connected via a cloud. The C-NCSG 410 automatically generates traffic steering policies that may be used throughout the system 400 to steer traffic from the source NCE 105A to the destination NCE 105B. The C-NCSG 410 continuously receives inputs 420 that may be used to dynamically generate traffic steering policies sent out to each element in the system 400. The C-NCSG 410 receives measurements of the network that are used to generate current traffic steering policies. The C-NCSG 410 may use a QOE score to generate traffic steering policies. The QOE score may be based on measurements of bandwidth, loss, latency, and/or jitter at each hop on the system 400. The bandwidth, loss, latency, and/or jitter may be measured at each hop to determine the QOE score at a per packet level or measuring at a per segment level. The C-NCSG 410 may determine a current QOE score at each hop along the system 400. The C-NCSG 410 may compare the current QOE score at each hop to a historical QOE score per path. The C-NCSG 410 may provide automated steering policies as an embedded control packet at each hop.

The C-NCSG 410 may also receive customer prioritization at an application level. The automated steering policies may also be based on the customer prioritization at the application level. The system 400 may include customer prioritization and SLA at an application level with 1 being the highest priority and 3 being the lowest priority. Application priority may be set at high (1), medium (2), or low (3) priority.

The C-NCSG 410 may generate automated steering policies based on a historic average bandwidth QOE score based on a bandwidth QOE score of each path. The C-NCSG 410 may generate automated steering policies based on a seven-day aggregate value of bandwidth at the hop and a seven-day aggregate value of bandwidth variance at the hop. The C-NCSG 410 may generate automated steering policies based on an average number of concurrent flows and a variance in the average number of concurrent flows at a specified time. The C-NCSG 410 may generate automated steering policies based on an average aggregate packet size and a variance in the average aggregate packet size at the specified time. The C-NCSG 410 may generate automated steering policies based on an average bandwidth at the specified time and a total number of samples of bandwidth.

The C-NCSG 410 may generate automated steering policies based on concurrent flows measured at the specified time and a total number of samples for concurrent flows. The C-NCSG 410 may generate automated steering policies based on a concurrent packet size at the specified time and a total number of samples of concurrent packet size. The C-NCSG 410 may generate automated steering policies based on a seven-day aggregate value of average package loss at a hop and a twenty-four-hour aggregate value of average packet loss at the hop.

The system 400 may include a cloud 430. The C-NCSG 410 can control communication over multiple clouds 430, such as but not limited to Amazon Web Services 430E, Google Cloud 430C, Microsoft Azure 430D, Megaport 430A, or Equinix 430B. Likewise, the C-NCSG 410 can control communication over multiple cellular networks such as but not limited to AT&T 440A and Verizon 440B. Likewise, the C-NCSG 410 can control communication over multiple telephone company networks 450.

Figure 5:
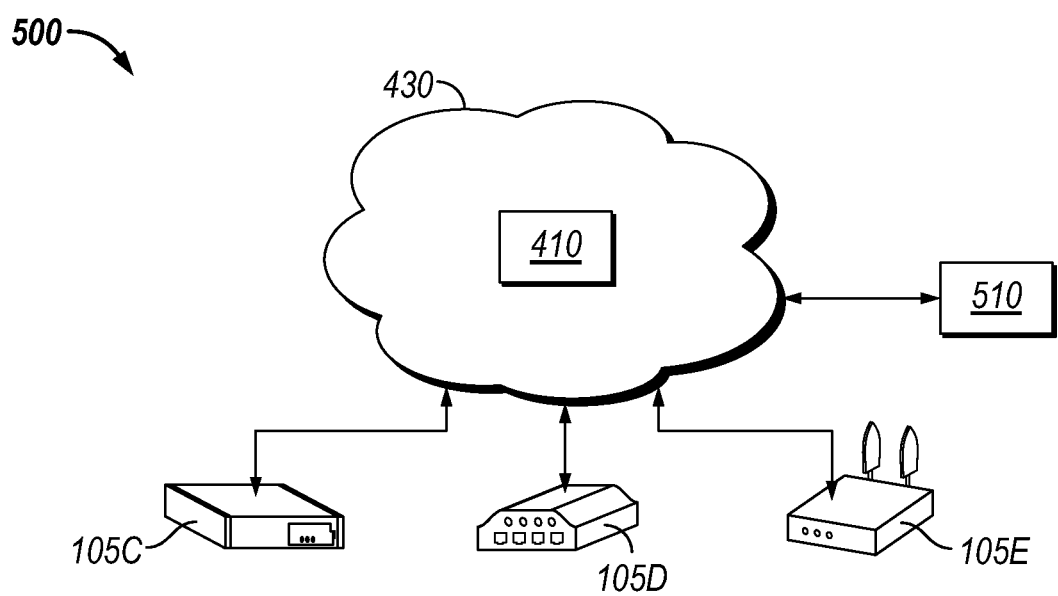
FIG. 5 is a schematic of an embodiment of a system for steering traffic.

FIG. 5 is a schematic of an embodiment of a system 500 for steering traffic. The system 500 may be a simple direct connect from various NCEs 105C, 105D, 105E to a cloud 430. The NCEs 105C, 105D, 105E are connected to a data center 510 via the cloud 430. A C-NCSG 410 located on the cloud 430 generates automated steering policies to steer the traffic between each of the NCEs and the data center 510 as discussed herein.

Figure 6:
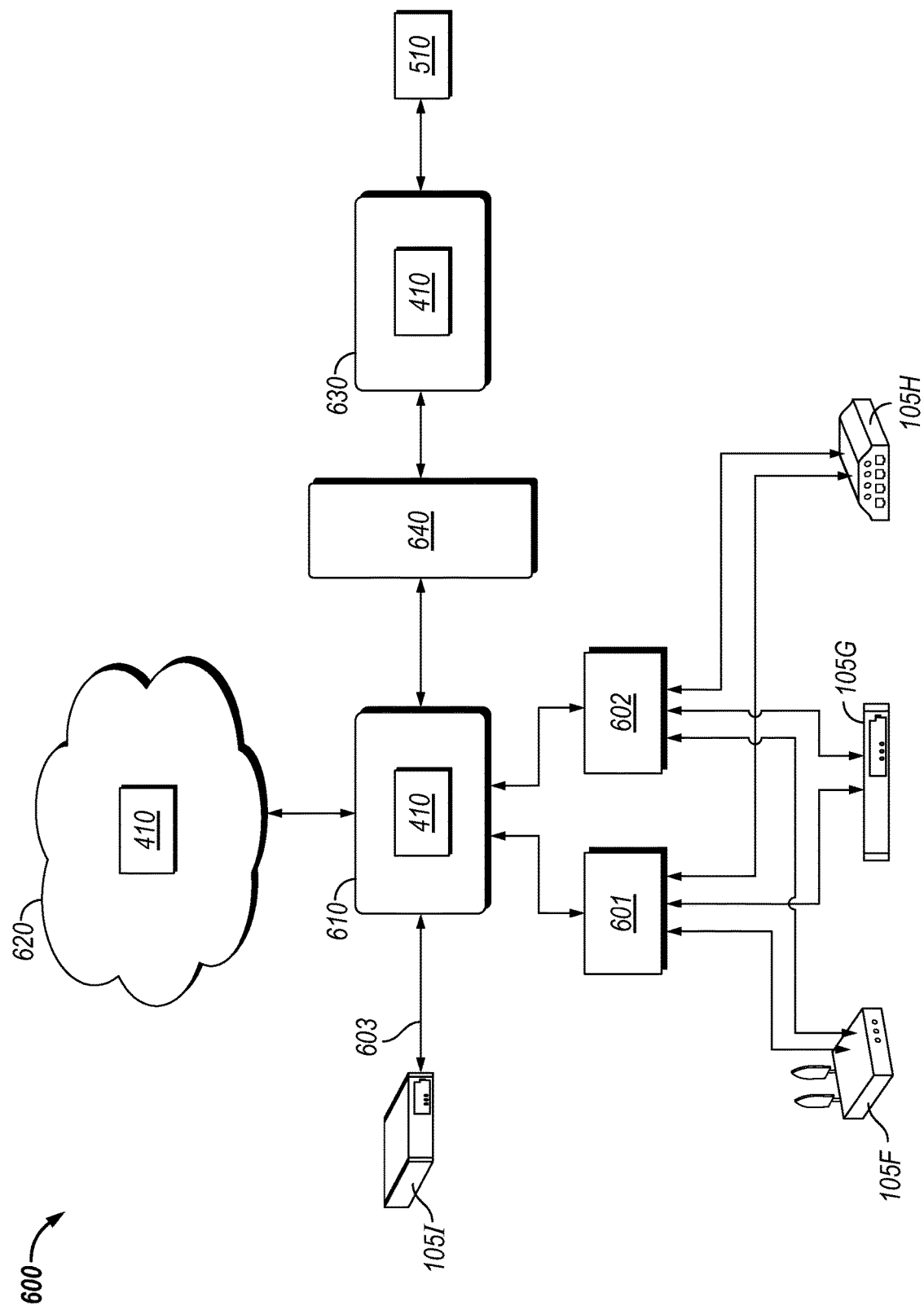
FIG. 6 is a schematic of an embodiment of a system for steering traffic.

FIG. 6 is a schematic of an embodiment of a system 600 for steering traffic. A plurality of NCEs 105F, 105G, 105H may be wirelessly connected to a first virtual data center 610 via a first cellular network 601 or via a second cellular network 602. Another NCE 105I may be connected to the first virtual data center 610 via a wired connection 603. The first virtual data center 610 may include a C-NCSG 410 that generates automated steering policies for the system 600 as discussed herein. The system 600 includes a second virtual data center 620 wirelessly connected to the first virtual data center 610. The second virtual data center 620 may include a C-NCSG 410 that generates automated steering policies for the system 600 as discussed herein.

The system 600 includes a third virtual data center 630. The third virtual data system 630 may be connected to the first virtual data center 610 by various networks 640 such as a cloud or cellular network as would be appreciated by one of ordinary skill in the art having the benefit of this disclosure. The third virtual data center 630 may also include a C-NCSG 410 that generates automated steering policies for the system 600. The system 600 includes a corporate data center 650 that is linked to the NCEs 105F-105I. The one or more C-NCSGs 410 generate automated steering policies to optimize communication between the corporate data center 650 and each of the NCEs 105F-105I.

Figure 7:
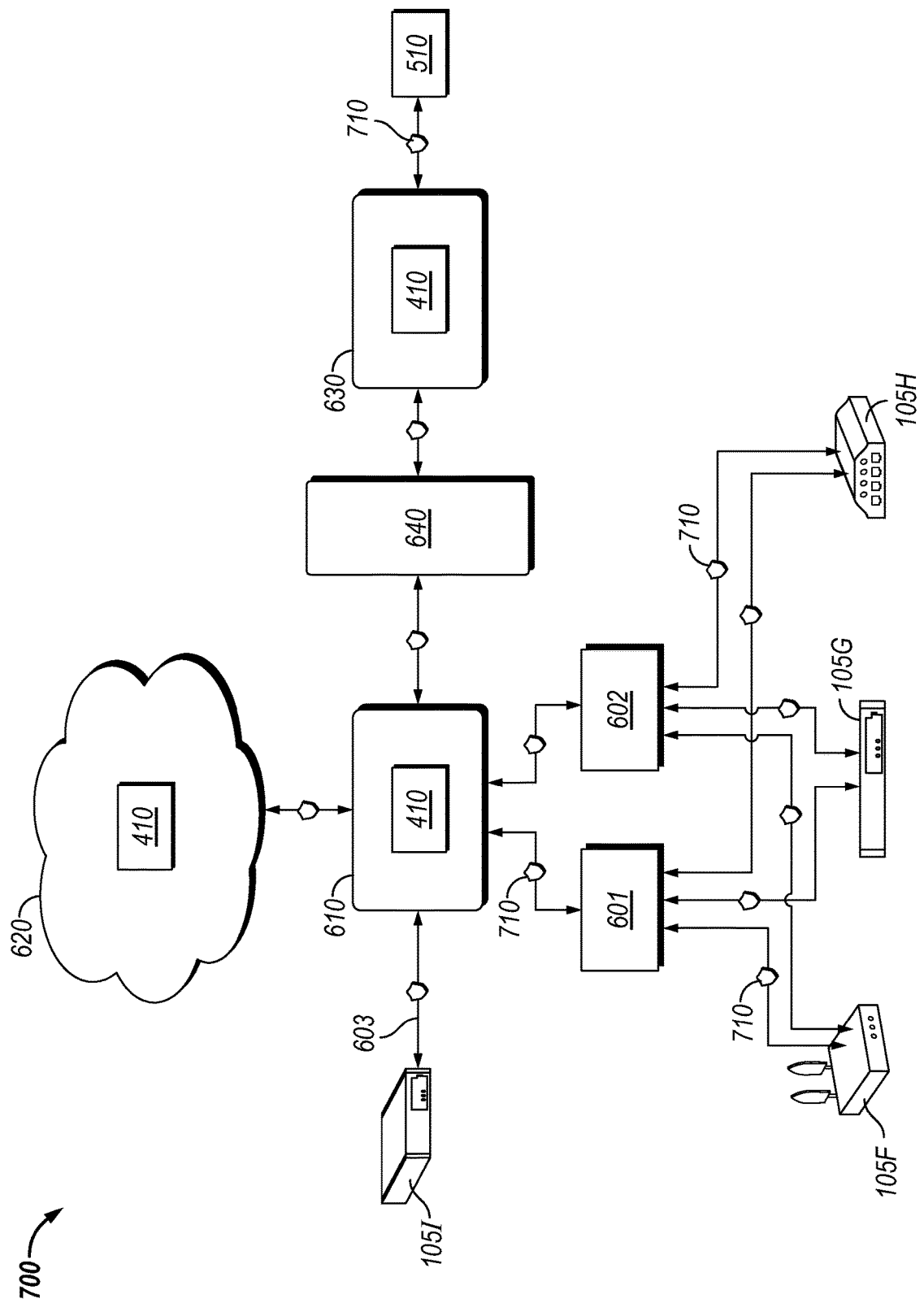
FIG. 7 is a schematic of an embodiment of a system for steering traffic.

FIG. 7 is a schematic of an embodiment of a system 700 for steering traffic. Like the system 600 of FIG. 6, a plurality of NCEs 105F, 105G, 105H may be wirelessly connected to a first virtual data center 610 via a first cellular network 601 or via a second cellular network 602. Another NCE 105I may be connected to the first virtual data center 610 via a wired connection 603. The first virtual data center 610 may include a C-NCSG 410 that generates automated steering policies for the system 600 as discussed herein. The system 600 includes a second virtual data center 620 wirelessly connected to the first virtual data center 610. The second virtual data center 620 may include a C-NCSG 410 that generates automated steering policies for the system 700 as discussed herein.

The system 700 includes a third virtual data center 630. The third virtual data system 630 may be connected to the first virtual data center 610 by various networks 640 such as a cloud or cellular network as would be appreciated by one of ordinary skill in the art having the benefit of this disclosure. The third virtual data center 630 may also include a C-NCSG 410 that generates automated steering policies for the system 700. The system 700 includes a corporate data center 650 that is linked to the NCEs 105F-105I. The one or more C-NCSGs 410 generate automated steering policies to optimize communication between the corporate data center 650 and each of the NCEs 105F-105I. The system 700 may be more secure than the system 600 of FIG. 6. System 700 may include increased security between each element of the system 700 as indicated by elements 710.

Figure 8:
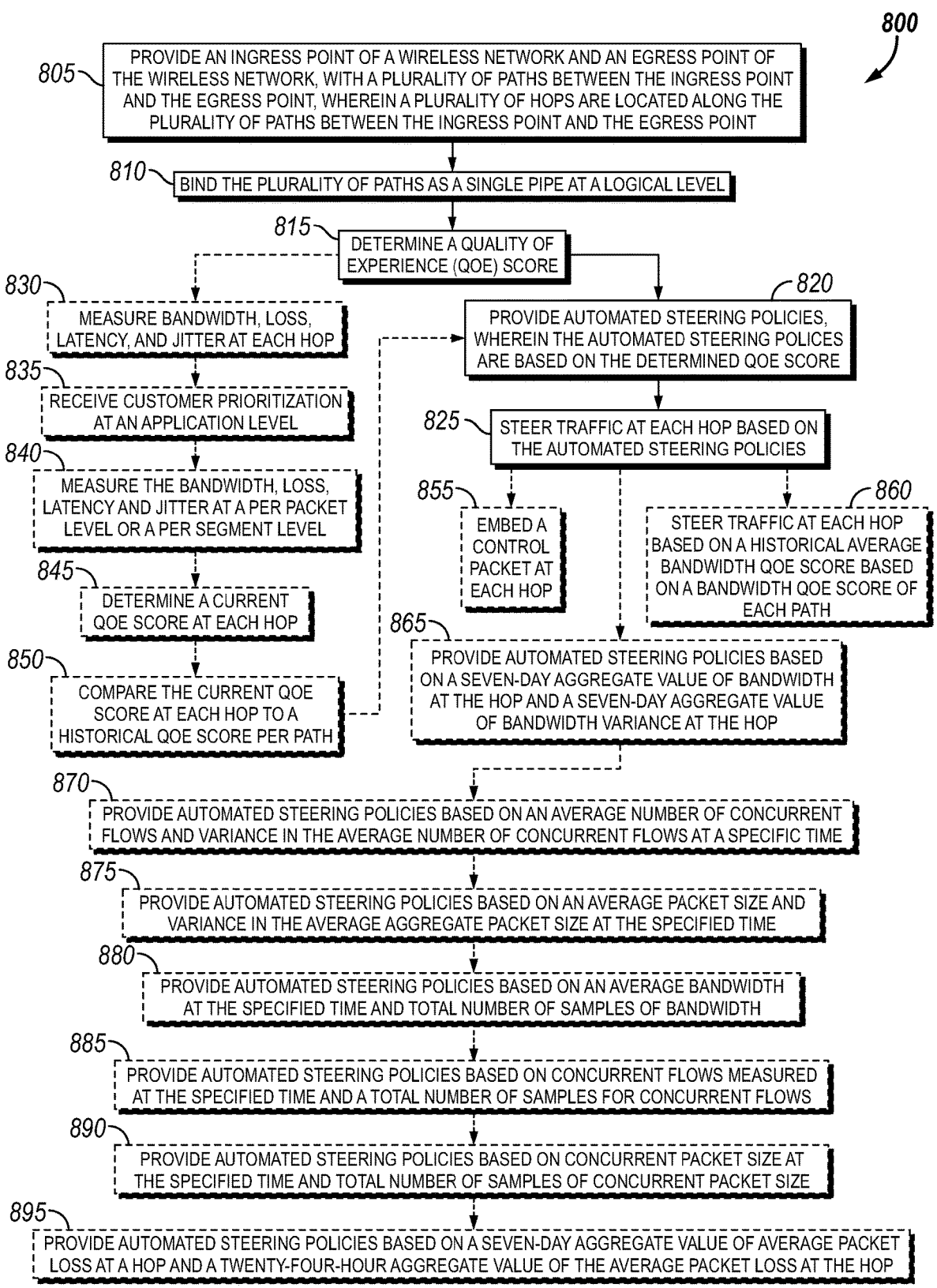
FIG. 8 is a flow chart of an embodiment of a method of the present to disclosure.

FIG. 8 is a flow chart of an embodiment of a method 800 for steering traffic in a wireless network. The method 800 includes providing an ingress point of the wireless network and an egress point of the wireless network, with a plurality of paths between the ingress point and the egress point, wherein a plurality of hops are located along the plurality of paths between the ingress point and the egress point, at 805. The method 800 includes binding the plurality of paths as a single pipe at a logical level, at 810. The method 800 includes determining a quality of experience (QOE) score, at 815. The method 800 includes providing automated steering policies, wherein the automated steering policies are based on the determined QOE score, at 820. The method 800 includes steering traffic at each hop based on the automated steering policies, at 825.

The method 800 may include measuring bandwidth, loss, latency, and jitter at each hop of the plurality of hops to determine the QOE score, at 830. The method 800 may include receiving customer prioritization at an application level. At 835. The automated steering policies may also be based on the customer prioritization at the application level. The method 800 may include measuring bandwidth, loss, latency, and jitter at each hop at a per packet level or measuring at a per segment level to determine the QOE score, at 840. The method 800 may include determining a current QOE score at each hop, at 845. The method 800 may include comparing the current QOE score at each hop to a historical QOE score per path, at 850. The method 800 may include embedding a control packet at each hop, at 855. The method 800 may include steering traffic at each hop may be based on a historic average bandwidth QOE score based on a bandwidth QOE score of each path, at 860.

The method 800 may include providing automated steering policies based on a seven-day aggregate value of bandwidth at the hop and a seven-day aggregate value of bandwidth variance at the hop, at 865. The method 800 may include providing automated steering policies based on an average number of concurrent flows and a variance in the average number of concurrent flows at a specified time, at 870. The method 800 may include providing automated steering policies based on an average aggregate packet size and a variance in the average aggregate packet size at the specified time, at 875. The method 800 may include providing automated steering policies based on an average bandwidth at the specified time and a total number of samples of bandwidth, at 880. The method 800 may include providing automated steering policies based on concurrent flows measured at the specified time and a total number of samples for concurrent flows, at 885. The method 800 may include providing automated steering policies based on a concurrent packet size at the specified time and a total number of samples of concurrent packet size, at 890. The method 800 may include providing automated steering policies based on a seven-day aggregate value of average package loss at a hop and a twenty-four-hour aggregate value of average packet loss at the hop, at 895.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A method for steering traffic in a wireless cloud-based network, the method comprising:
    providing an ingress net cloud services gateway (I-NCSG) of the wireless cloud-based network and an egress net cloud services gateway (E-NCSG) of the wireless cloud-based network, with a plurality of paths between the I-NCSG and the E-NCSG, wherein a plurality of hops are located along the plurality of paths between the I-NCSG and the E-NCSG;
    binding the plurality of paths as a single pipe at a logical level;
    determining a quality of experience (QOE) score;
    providing automated steering policies, wherein the automated steering policies are based on the determined QOE score;
    steering traffic at each hop based on the automated steering policies wherein the automated steering policies include a rule for choosing the next hop that is a function of a Application Packet Priority (APPR) calculated as APPR=(BQOe+FQOe+PQOe+PBQOe+PCQOe)*ASLA, where ASLA is a customer prioritization at the application level, and a calculated Application Packet Loss (APLOSS); and
    wherein:
        ATB7 is the Average Time of Day Bandwidth at Hop—Last 7 Days;
        AVTB7 is the Average Time of Day Bandwidth Variance at Hop—Last 7 Days;
        ANCT is the Average Number of Concurrent Flows at Time—Time of Day;
        ANCVT is the Variance in Concurrent Flows—Time of Day;
        AAPST is the Average Aggregated Packet Size—Time of Day;
        AVPST is the Variance in Packet Size—Time of Day;
        BQOe=1 if (Current Bandwidth−ATB7) is between −3*AVTB7 and 3*AVTB7 and =0 otherwise;
        FQOe=1 if (Current Flows−ANCT) is between −3*ANCVT and 3*ANCVT and =0 otherwise;
        PQOe=1 if (Current Concurrent Packet Size−AAPST) is between −3*AVPST and 3*AVPST and =0 otherwise;
        PBQOe=0 if (Packet Size >50% ATB7) and =1 otherwise; and
        PCQOe=0 if (Packet Size/Current concurrent packet size) >0.5 and =1 otherwise.

2. The method of claim 1, wherein determining QOE score further comprises measuring bandwidth, loss, latency, and jitter at each hop of the plurality of hops.

3. The method of claim 2, further comprising receiving customer prioritization at an application level, wherein the automated steering policies are further based on the customer prioritization at the application level.

4. The method of claim 3, wherein measuring bandwidth, loss, latency, and jitter at each hop to determine the QOE score further comprises measuring at a per packet level or measuring at a per segment level.

5. The method of claim 4, further comprising determining a current QOE score at each hop.

6. The method of claim 5, further comprising comparing the current QOE score at each hop to a historical QOE score per path.

7. The method of claim 1, wherein providing automated steering policies further comprises embedding a control packet at each hop.

8. The method of claim 1, wherein steering traffic at each hop is further based on a historic average bandwidth QOE score based on a bandwidth QOE score of each path.

9. The method of claim 1, wherein providing automated steering policies is further based on a seven-day aggregate value of bandwidth at the hop and a seven-day aggregate value of bandwidth variance at the hop.

10. The method of claim 9, wherein providing automated steering policies is further based on an average number of concurrent flows and a variance in the average number of concurrent flows at a specified time.

11. The method of claim 10, wherein providing automated steering policies is further based on an average aggregate packet size and a variance in the average aggregate packet size at the specified time.

12. The method of claim 11, wherein providing automated steering policies is further based on an average bandwidth at the specified time and a total number of samples of bandwidth.

13. The method of claim 12, wherein providing automated steering policies is further based on concurrent flows measured at the specified time and a total number of samples for concurrent flows.

14. The method of claim 13, wherein providing automated steering policies is further based on a concurrent packet size at the specified time and a total number of samples of concurrent packet size.

15. The method of claim 14, wherein providing automated steering policies is further based on a seven-day aggregate value of average package loss at a hop and a twenty-four-hour aggregate value of average packet loss at the hop.

16. A system comprising:
a cloud network;
a controller net cloud services gateway (C-NCSG);
an ingress net cloud services gateway (I-NCSG);
an egress net cloud services gateway (E-NCSG); and
a plurality of paths between the I-NCSG and the E-NCSG;
a plurality of hops along the plurality of paths, wherein the C-NCSG generates automated steering policies and each hop steers traffic along the plurality of paths between the I-NCSG and the E-NCSG based on the automated steering policies wherein the automated steering policies include a rule for choosing the next hop that is a function of a Application Packet Priority (APPR) calculated as (APPR)=(BQOe+FQOe+PQOe+PBQOe+PCQOe)*ASLA, where ASLA is a customer prioritization at the application level, and a calculated Application Packet Loss (APLOSS); and
wherein:
ATB7 is the Average Time of Day Bandwidth at Hop—Last 7 Days;
AVTB7 is the Average Time of Day Bandwidth Variance at Hop—Last 7 Days;
ANCT is the Average Number of Concurrent Flows at Time—Time of Day;
ANCVT is the Variance in Concurrent Flows—Time of Day;
AAPST is the Average Aggregated Packet Size—Time of Day;
AVPST is the Variance in Packet Size—Time of Day;
BQOe=1 if (Current Bandwidth−ATB7) is between −3*AVTB7 and 3*AVTB7 and =0 otherwise;
FQOe=1 if (Current Flows−ANCT) is between −3*ANCVT and 3*ANCVT and =0 otherwise;
PQOe=1 if (Current Concurrent Packet Size−AAPST) is between −3*AVPST and 3*AVPST and =0 otherwise;
PBQOe=0 if (Packet Size>50% ATB7) and =1 otherwise; and
PCQOe=0 if (Packet Size/Current concurrent packet size) >0.5 and =1 otherwise.

17. The system of claim 16, wherein the C-NCSG generates the automated steering policies based on a customer prioritization at an application level.

18. The system of claim 17, wherein the C-NCSG further generates the automated steering policies based on a quality of experience (QOE) score.

19. The system of claim 18, wherein the QOE score is determined by a measurement of bandwidth, loss, latency, and jitter at each hop.

20. The system of claim 19, wherein the measurement of bandwidth, loss, latency, and jitter is measured at a per packet level or at a per segment level.

* * * * *